(12) United States Patent
Kelley et al.

(10) Patent No.: US 11,468,009 B2
(45) Date of Patent: *Oct. 11, 2022

(54) SECURE COMPRESSION

(71) Applicant: Brown University, Providence, RI (US)

(72) Inventors: James Kelley, Waltham, MA (US); Roberto Tamassia, Providence, RI (US)

(73) Assignee: Brown University, Providence, RI (US)

( * ) Notice: Subject to any disclaimer, the term of this patent is extended or adjusted under 35 U.S.C. 154(b) by 296 days.

This patent is subject to a terminal disclaimer.

(21) Appl. No.: 16/572,167

(22) Filed: Sep. 16, 2019

(65) Prior Publication Data
US 2020/0012622 A1 Jan. 9, 2020

Related U.S. Application Data

(63) Continuation of application No. 14/895,063, filed as application No. PCT/US2014/040727 on Jun. 3, 2014, now Pat. No. 10,417,187.

(60) Provisional application No. 61/830,399, filed on Jun. 3, 2013.

(51) Int. Cl.
*G06F 16/17* (2019.01)
*H04L 9/08* (2006.01)
*G06F 7/58* (2006.01)

(52) U.S. Cl.
CPC .......... *G06F 16/1727* (2019.01); *G06F 7/582* (2013.01); *H04L 9/0869* (2013.01); *H04L 2209/30* (2013.01)

(58) Field of Classification Search
CPC .......................... H04L 2209/30; G06F 16/1727
See application file for complete search history.

(56) References Cited

U.S. PATENT DOCUMENTS

| 6,624,762 | B1 | 9/2003 | End |
| 2007/0028088 | A1 | 2/2007 | Bayrak et al. |
| 2009/0309769 | A1* | 12/2009 | Au .......................... H04L 9/002 341/51 |
| 2010/0127902 | A1* | 5/2010 | Schneider ........... H03M 7/3088 341/51 |

(Continued)

OTHER PUBLICATIONS

International Search Report and Written Opinion for International Application No. PCT/US2014/040727 dated Feb. 27, 2015, 12 pages.

*Primary Examiner* — Grace Park
(74) *Attorney, Agent, or Firm* — Adler Pollock & Sheehan P.C.

(57) ABSTRACT

In embodiments, secure compression algorithms are provided that may be employed as a single operation on raw data to produce compressed and encrypted data. In embodiments, the algorithms described herein may be performed using any type of dictionary based encryption. In one embodiment, upon adding a new prefix to a dictionary table, the dictionary table may be permuted to randomize the entries into the table. The randomization may be based upon a permutation value generated by a deterministic pseudo-random generator and/or pseudo-random function. Other embodiments of randomization may be employed to provide secure compression. For example, instead of permuting the entire table upon adding a prefix, the prefix may be randomly added to the table.

10 Claims, 7 Drawing Sheets

(56) References Cited

U.S. PATENT DOCUMENTS

2011/0103703 A1\* 5/2011 Karlov .................. H03M 7/607
382/239

\* cited by examiner

SECURE COMPRESSION

PRIORITY

This application is a continuation application of U.S. patent application Ser. No. 14/895,063 filed on Dec. 1, 2015, which is a National Stage Application of PCT/US2014/040727, filed Jun. 3, 2014, which claims benefit of U.S. Provisional Patent Application No. 61/830,399, entitled "Secure Compression," filed on Jun. 3, 2013, and which applications are incorporated herein by reference. To the extent appropriate, a claim of priority is made to each of the above disclosed applications.

GOVERNMENT LICENSE RIGHTS

This invention was made with government support under CNS1012060 awarded by National Science Foundation (NSF). The government has certain rights in the invention.

BACKGROUND

Data is generally compressed to minimize the resources needed to store and/or transfer data. Often, data is also encrypted to limit the accessibility of the data to authorized users. Generally, separate operations are required to compress and encrypt the data. However, performing two separate operations to compress and encrypt data can be resource intensive, particularly when performed a large amount of data. It is with respect to these and other general considerations that embodiments have been made. Efficient use of computational resources can made if a single operation is provided to both compress and encrypt data. Also, although relatively specific problems have been discussed, it should be understood that the embodiments should not be limited to solving the specific problems identified in the background.

SUMMARY

Embodiments of the present disclosure relate to systems and methods that may be employed to perform secure compression as a single operation or a single primitive. In embodiments, secure compression algorithms are provided that may be employed as a single operation on raw data to produce compressed and encrypted data. In one embodiment, upon adding a new prefix to a dictionary table, the dictionary table may be permuted to randomize the entries into the table. The randomization may be based upon a permutation value generated by a deterministic pseudo-random generator and/or pseudo-random function such that, given a specific key, the randomization will be the same. This allows a decryption method to reproduce the randomized dictionary table to properly decrypt a securely compressed file. Other embodiments of randomization may be employed to provide secure compression. For example, instead of permuting the entire table upon adding a prefix, the prefix may be randomly added to the table. In addition to secure compression algorithms, the present disclosure provides exemplary decryption algorithms that may be used to decrypt a securely compressed file.

The present disclosure also provides exemplary methods for randomly inserting entries into a table, such as a dictionary table. In one aspect, a random index may be identified using a deterministic pseudo-random generator and/or pseudo-random function. A new entry to the table may be added at the random index. If the random index is occupied by another entry, the resident data at that index may be evicted to add the new entry. A second random index may be generated and the evicted resident data may be stored in the table at the second random index.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense. While different embodiments are illustrated, one of skill in the art will appreciate that different aspects from the different embodiments may be combined without departing from the scope of this disclosure.

Embodiments of the present disclosure relate to systems and methods that may be employed to perform secure compression as a single operation or a single primitive. In embodiments, secure compression algorithms are provided that may be employed as a single operation on raw data to produce compressed and encrypted data. In embodiments, the algorithms described herein may be performed using any type of dictionary based encryption. Exemplary dictionary based encryption algorithms include, but are not limited to, LZ78, LZW, LZAP, LZF, FastLZ, SCZ, etc. While specific dictionary based compression algorithms are provided in this disclosure, one of skill in the art will appreciate that the embodiments disclosed herein may be employed using other types of dictionary based compression algorithms. A dictionary based compression algorithm may be modified to produce compressed and encrypted data by randomizing entries to a dictionary table. In embodiments, a key may be used as a seed value for a random number generator. Output from the random number generator can be used to permute the dictionary table as entries are added, resulting in a table in which prefixes added to the dictionary table are matched to random indexes. In order to correctly decrypt the file, the same key may be provided to reconstruct the randomized dictionary table. Without the key, the file may not be properly decrypted.

Figure 1:
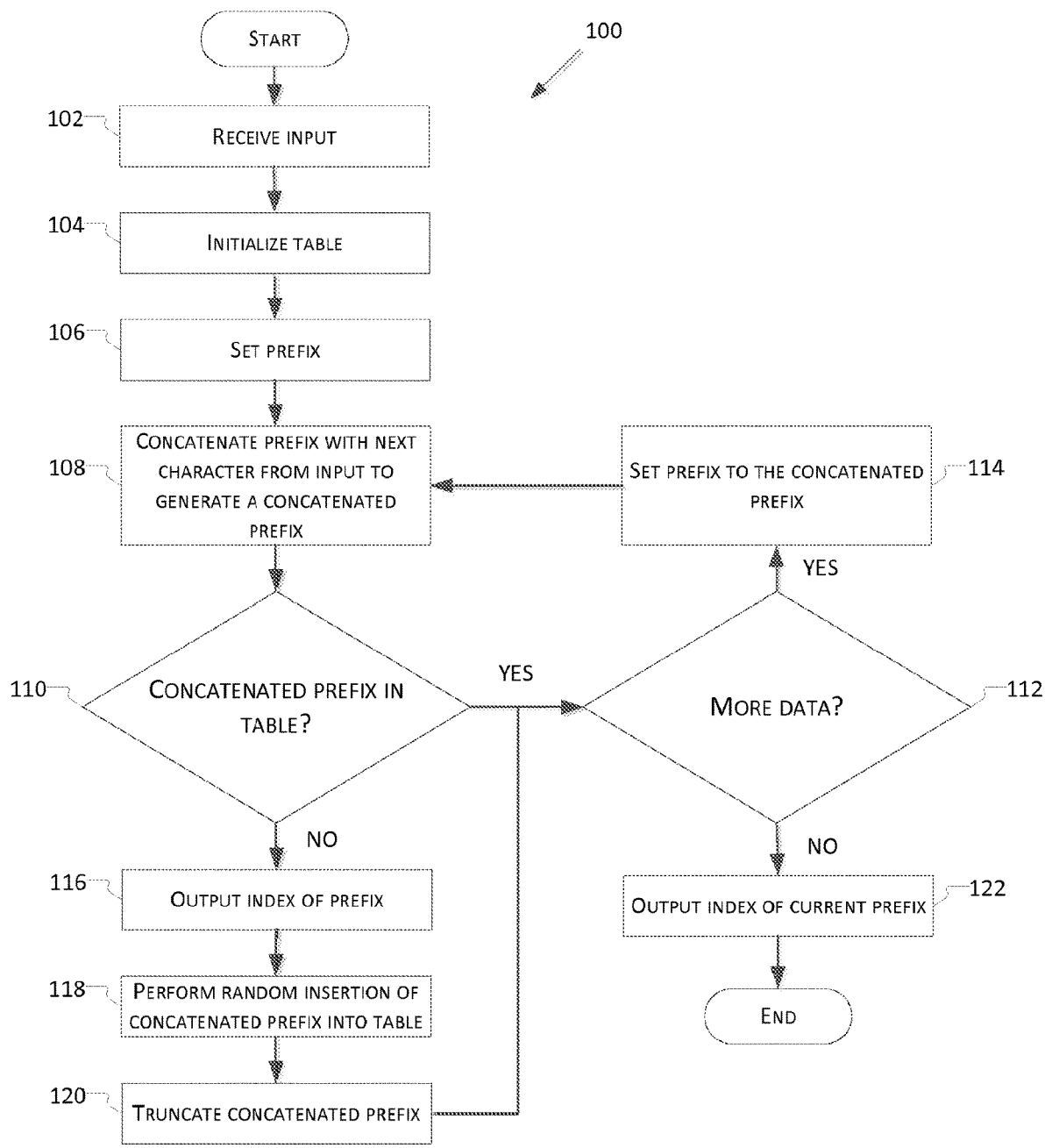
FIG. 1 is an exemplary method 100 for performing secure compression.

FIG. 1 is an exemplary method 100 for performing secure compression. The method 100 may be employed to encrypt and compress a file or streamed data in a single operation to generate a securely compressed file. The securely compressed files may comprise the indexes of entries added to a dictionary table. Upon receiving a file or streamed data, flow begins at operation 102 where the method 100 receives input for secure compression. One of skill in the art will appreciate that the input may comprise any type of files (e.g., images, documents, videos, etc.) or streamed data without departing from the scope of this disclosure. Upon receiving the data, flow continues to operation 104 where a table is initialized. In one example, initializing the table may comprise inserting one or more single character string, e.g. creating an index for each letter of the alphabet (e.g., A-Z) and an end of file (EOF) indicator into the table. In another example, other entries may be inserted into the table upon initialization, for example, using different letters from different alphabets, common letter pairings, common words, etc. One of skill in the art will appreciate that any number of different ways of initializing a table may be employed without departing from the scope of this disclosure. Initializing the table may also include generating a seed value based upon a key. In one aspect, the seed value may be generated providing the key value as input to a pseudo-random function (PRF) that generates a seed value based upon the key. In embodiments, the PRF may be a function that will generate the same seed value given the same key. Such a PRF may be used to ensure that a decryption method generates the same seed given the same key, thereby allowing the decryption method to properly decrypt a securely compressed file. The seed value may also be provided to a pseudo-random generator (PRG) to generate a permutation that may be applied to the table. Similar to the PRF, the PRG may be a generator that will generate the same permutation given the same key to ensure proper decryption.

Upon initializing the table, flow continues to operation 106, where a prefix value is set. Different types of data may be set as the prefix. In one example, the prefix may be the first character of the string in the file. In another example, the first prefix may be the first bit or byte of a file. Initially setting the prefix at operation 106 may also comprise outputting the index value for the prefix to the securely compressed file. Flow continues to operation 108 where the next character is read from the input. As previously discussed, the next character may be a letter, a number, a bit value, or a byte. In aspects, the next character may be concatenated onto the end of the prefix value to generate a concatenated prefix. Flow continues to decision operation 110 where a lookup is performed on the table to determine whether the concatenated prefix has an entry in the table. If the concatenated prefix is in the table, flow branches YES to operation 112. At operation 112, a determination is made whether there is more file data to compress. If there is not, then the all of the data in the file has been securely compressed and the securely compressed file is completed. As such, flow branches No from decision operation 112 and to operation 122 where the index of the current prefix is outputted to complete the securely compressed file. However, if there is more data left to securely compress, flow branches YES to operation 114. At operation 114, prefix value is set to equal the concatenated prefix and then flow returns to operation 108 where the method continues from that operation.

Returning to decision operation 110, if the concatenated prefix is not in the table, flow branches NO to operation 116. At operation 116, the index of the prefix is output for the securely compressed file. Flow continues to operation 118 where the concatenated prefix is randomly inserted into the table. Random insertion of the concatenated prefix may comprise inserting the concatenated prefix at a random index in the table and/or inserting the concatenated prefix into the next available index in the table and then randomizing all the table entries. While specific examples of randomization are provided in this disclosure, one of skill in the art will appreciate that other methods of randomly inserting an entry into a table may be employed without departing from the spirit of this disclosure. For example, the another type of randomization may be to randomly swap the prefix with another entry in the table. Flow continues to operation 120 where the concatenated prefix is truncated to the most recently read input (e.g., character, number, string, byte, etc.). After randomly inserting the concatenated prefix into the table and resetting the prefix to the last read input, flow continues to decision operation 112 and the method 100 continues until there is no more data to be securely compressed for the particular file or stream of data received at operation 102.

Having described a general method for performing secure compression, the disclosure will now describe various exemplary methods of securely compressing data. While specific examples are provided, one of skill in the art will appreciate that the different aspects of the exemplary methods may be combined without departing from the spirit of this disclosure. Furthermore, while specific examples are provided in this disclosure, the examples are provided for ease of illustration. One of skill in the art will appreciate that other methods of securely compressing data in a single primitive may be employed without departing from the scope of this disclosure.

Figure 2:
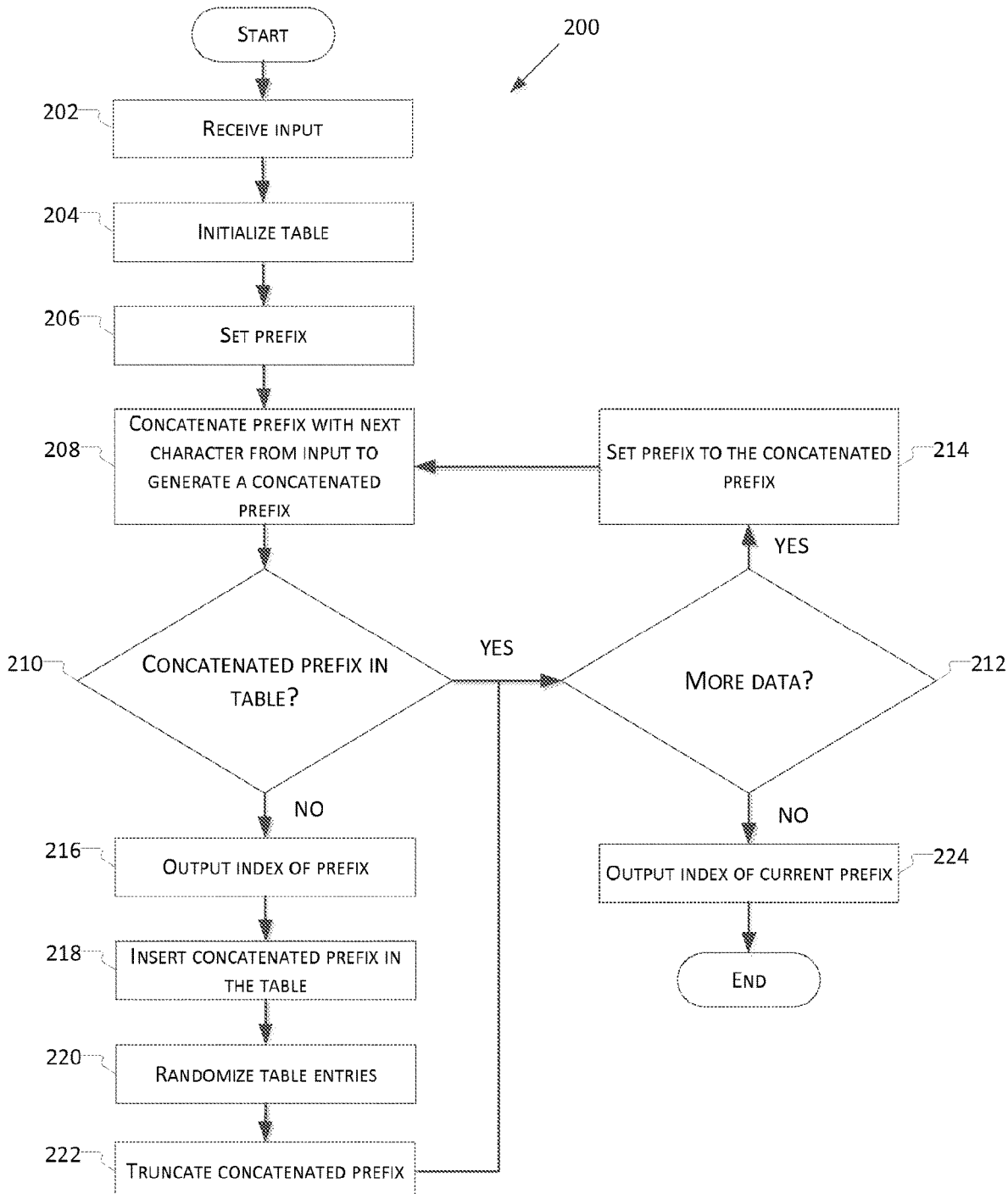
FIG. 2 is an exemplary method 200 for performing secure compression by permuting a dictionary table.

FIG. 2 is an exemplary method 200 for performing secure compression by permuting a dictionary table. In the illustrated embodiment, the random insertion of the concatenated prefix into a table, as described in operation 118 of FIG. 1, comprises permuting the table to randomize the indexes of the entries in the table after inserting the concatenated prefix. Operations 202, 204, 206, 208, 210, 212, 214, 216, and 224 illustrated in FIG. 2 are performed similarly to operations 102, 104, 105, 108, 110, 112, 114, 116, and 122 of FIG. 1 and, for the sake of brevity, will not be described again with respect to FIG. 2.

Jumping to decision operation 210, upon determining that a concatenated prefix is not in the table, e.g., flow branches NO from decision operation 210, the index of the prefix is output to the securely compressed file at operation 216 and flow continues to operation 218 where the concatenated prefix is added to the table. In one aspect, the concatenated prefix may be inserted into the next available index in the table. For example, the entries may be added sequentially into the table. After adding the concatenated prefix to the table, flow continues to operation 220 where the table entries are randomized. Randomizing the table may comprise permuting the table such as the entries in the table are randomly reassigned. In another aspect, the table layout may be randomized at operation 220. In one aspect, the randomization of the table entries may be based on a permutation value. The permutation value may be generated using a PRF and/or a PRG based upon a key. As previously discussed, the PRF and/or the PRG employed by the method 200 may be deterministic, that is, the PRF and/or PRG may produce the same value given the same input. As such, a key may be used to generate the permutation to securely compress the file. The same key may then be used to decrypt the securely compressed file using the deterministic PRF and/or PRG to derive the same permutation value used to randomize the table layout by the exemplary secure compression method 200. Flow continues to operation 222 where the concatenated prefix is truncated to the most recently read input (e.g., character, number, string, byte, etc.). Flow then continues to decision operation 212 and the method 200 continues until there is no more data to be compressed from the file or data stream received at operation 202.

FIG. 2 illustrates an exemplary method for performing secure compression by permuting a dictionary table. Table 1 provides exemplary pseudo-code for performing secure compression by permuting a dictionary table.

TABLE 1

Figure 3:
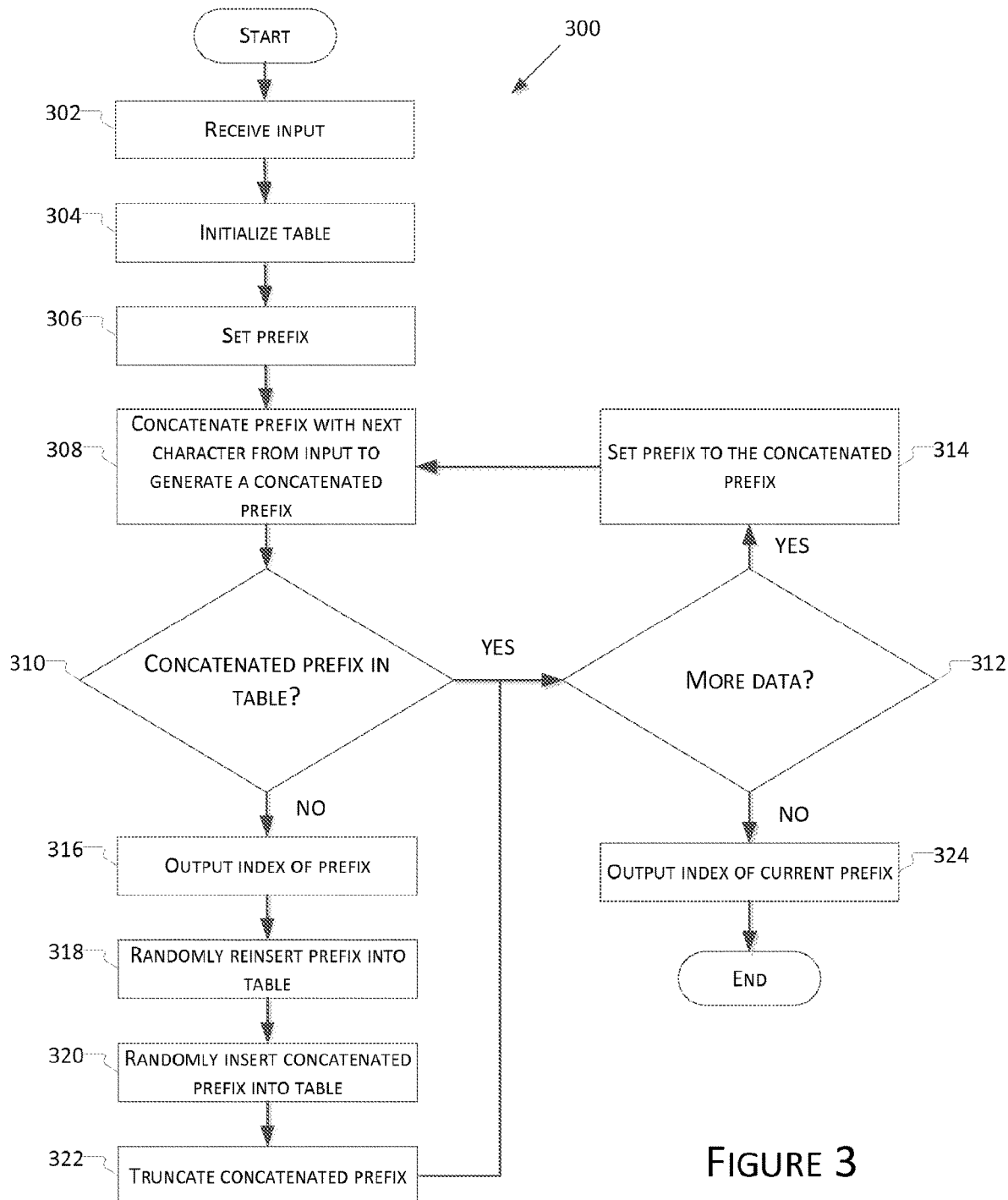
FIG. 3 is an exemplary method 300 for performing secure compression by randomizing entries into a dictionary table.

Input: key k and input stream I
Output: encrypted, compressed output stream O
Create initialization vector iv   //Creation of iv is implementation specific, but iv must be
                                                  unique
Initialize table T with all single-character strings and EOF symbol
s ← f(k, iv)                                   //f is a PRF
Output iv
Seed G with s                                //G is a PRG
Generate a pseudo-random permutation π and apply it to T
Prefix ← Λ                                   //Initialize prefix to the empty string
while there is more input in I do      //Find longest prefix of I that is in T
    Read next character c
    if prefix ∘ c in T then
        prefix ← prefix ∘ c
    else                                          //prefix is the longest prefix of the input in T
        Output index of prefix in T
        Insert prefix ∘ c into T
        Generate a pseudo-random permutation π and apply it to T   // Randomize the
        table
                                                                                                               layout
        prefix ← c
    end if
end while
if prefix ≠ Λ then
    Output index of prefix in T
end if
    Output index of EOF in T FIG. 3 is an exemplary method 300 for performing secure compression by randomizing entries into a dictionary table. The method 300 provides a more efficient example of performing secure compression than the exemplary method illustrated in FIG. 2 because the method 300 does not require the permutation of the table after adding a concatenated prefix. Flow begins at operation 302 where the method 300 receives input for secure compression. One of skill in the art will appreciate that the input may comprise any type of files (e.g., images, documents, videos, etc.) or streamed data without departing from the scope of this disclosure.

Upon receiving the data, flow continues to operation 304 where a table is initialized. In one example, operation 304 initializes a table as described with respect to operation 104 of FIG. 1. In another example, initializing the table may include setting up a PRF and/or PRG to generate a seed value based upon a key. As previously discussed the PRF and/or PRG may be deterministic. The seed may be used to perform a random insertion of the initial entries for the table. The initial entries may comprise one or more single character string, e.g. creating an index for each letter of the alphabet (e.g., A-Z) and an end of file (EOF) indicator. In another example, other initial entries may be created, for example, using different letters from different alphabets, common letter pairings, common words, etc. Rather than sequentially inserting the initial entries, the initial entries may be randomly inserted into the initialized table based upon the seed value generated by the PRF and/or PRG. Table 2 provides exemplary pseudo-code for initializing a table by randomly inserting initial entries into the table. As part of the initialization process, Message Authentication Codes (MACs) may be employed to detect corruption of data within the table and/or securely compressed file.

TABLE 2 function INITIALIZESQUEEZE($k_{prf}$, $k_{mac}$, iv, G, T, p, c, m)
    Compute seed = $f k_{prf}$(iv)        //Set up the pseudo-random generator
    Seed G with seed
    p ← Λ

TABLE 2-continued c ← Λ
    MACINITIALIZE($k_{mac}$, m)
    MACUPDATE($k_{mac}$, m, iv)       //Update the MAC to include
the nonce iv
    Initialize table T                            //Initialize T for
decryption
    for each single character string s do
        RANDOMINSERT(s, T)
    end for
end function After initializing the table, flow continues to operation 306. Operations 306, 308, 310, 312, 314, 316, and 324 of FIG. 3 are performed similarly to operations 102, 104, 105, 108, 110, 112, 114, 116, and 122 of FIG. 1 and, for the sake of brevity, will not be described again with respect to FIG. 3. Jumping to decision operation 310, upon determining that a concatenated prefix is not in the table, e.g., flow branches NO from operation 310, the index of the prefix is output to the securely compressed file at operation 310. Flow continues to operation 318 where the prefix is randomly reinserted into the table. Random insertion of an entry into the table is described further with respect to FIG. 4. Flow continues to operation 320 where the concatenated prefix is randomly inserted into the table. Flow continues to operation 222 where the concatenated prefix is truncated to the most recently read input (e.g., character, number, string, byte, etc.). Flow then returns to decision operation 312 and the method 300 continues until there is no more data to be compressed from the file or data stream received at operation 302. Table 3 provides exemplary pseudo-code for performing secure compression by randomly inserting tables into a dictionary table. As described above, a MAC may be employed to detect the corruption of data during the compression process.

erate the same random entries. After generating or identifying a random index for the table, flow continues to decision operation 406 where a determination is made as to whether the random index is occupied. A random index may be occupied if it contains an entry for the table. If the random index is not occupied, flow branches NO to operation 408 where the entry is inserted into the table at the random index and the method 400 completes.

If the random index is occupied, flow branches YES to operation 410 where the resident data at the random index in evicted. In one example, the resident data may be saved to a temporary memory location, stored in a temporary variable, or otherwise copied. Flow continues to operation 412 where the entry received at operation 402 is inserted into the

TABLE 3

```
Input: keys k_prf and k_mac, input character stream I
Output: encrypted output stream O
    Create initialization vector iv        //Creation of iv is implementation specific, but iv
                                              must be unique.
                                           //Initialize PRG G, table T, variables prefix and c,
                                              and MAC m
    INITIALIZESQUEEZE(k_prf, k_mac, iv, G, T, prefix, c, m)
    while there is more input in I do      //Start compressing and encrypting stream I
        Read next character c
        if prefix o c in T then
            prefix ← prefix o c
        else
            Output index i of prefix in T
            MACUPDATE(k_mac, m, i)         //Update the MAC to include i
            RANDOMINSERT(prefix, T)        //insert prefix in a random position in T
            RANDOMINSERT(prefix o c, T)
            prefix ← c
        end if
    end while
    if prefix ≠ Λ then                     //Make sure we get any straggling input
        Output index i of prefix in T
        MACUPDATE(k_mac, m, i)
    end if
    MACFINALIZE(k_mac, m)                  //Finish computing the MAC
Output m
```

In embodiments, the method 300 may be more efficient than the method 200 because the method 300 does not permute the entire dictionary table each time a concatenated prefix is added to the table. As such, the secure compression method 300 may be performed without utilizing as much processing resources as the method 200.

Figure 4:
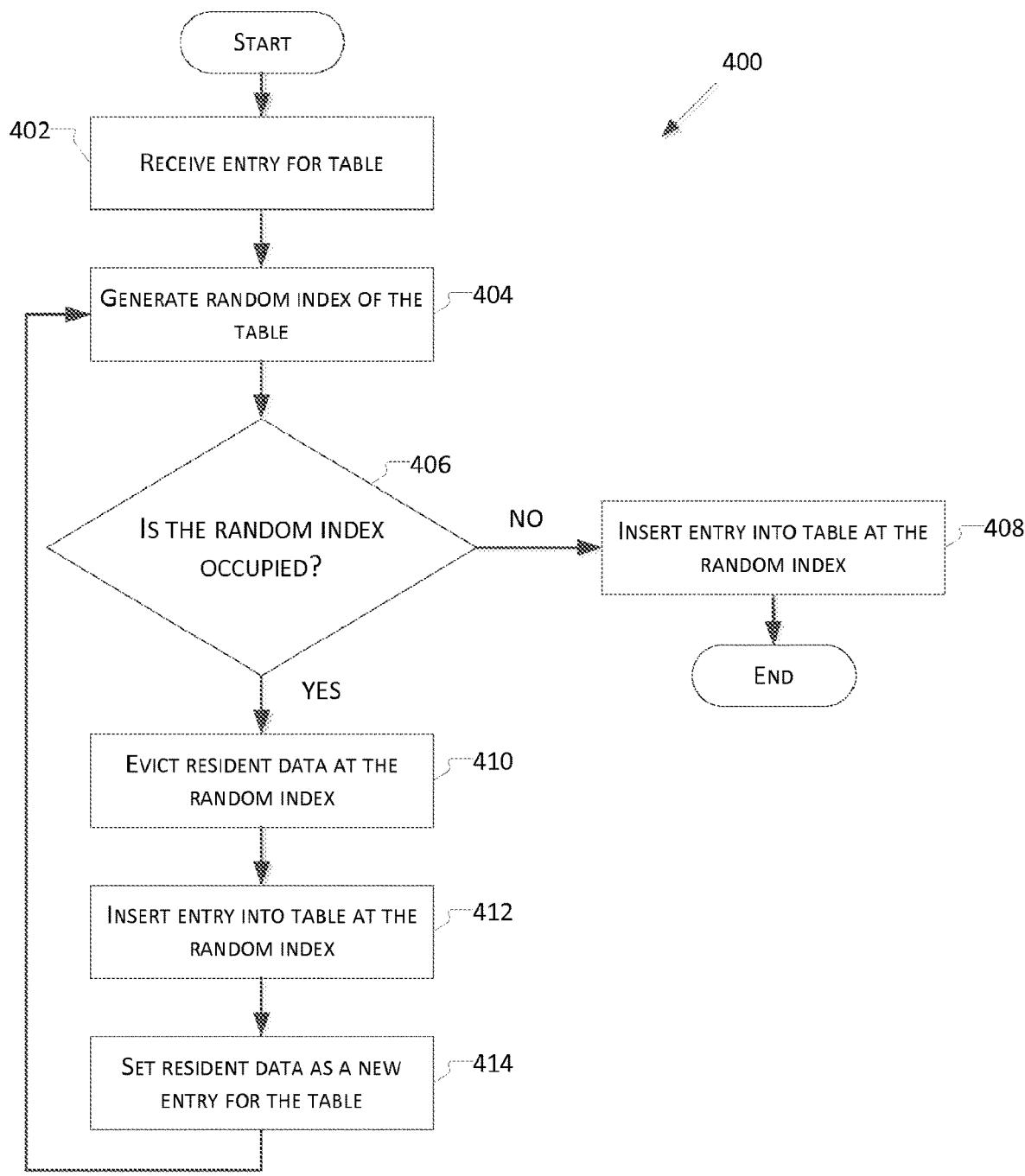
FIG. 4 is an exemplary method 400 for randomly inserting entries into a table.

FIG. 4 is an exemplary method 400 for randomly inserting entries into a table. The method 400 may be performed during operation 302 of FIG. 3 when the table is initialized, during operation 318 of FIG. 3 when the prefix entry is reinserted into the table, and/or during operation 320 of FIG. 3 when the concatenated prefix is inserted into the table. However, one of skill in the art will appreciate that other methods of randomly adding entries to a table may be employed without departing from the spirit of this disclosure.

Flow begins at operation 402 where the method 400 receives data for entry into the table. The data received may be a prefix, a concatenated prefix, one or more bytes, one or more bits, a character, a string, or any other type of data that may be entered into a table. Flow continues to operation 404 where a random index may be selected for a table. In one embodiment, a random index may be selected using a PRF and/or PRG. In one embodiment, the PRF and/or PRG may be deterministic such that the generator or function generates the same random number given the same input, e.g., a key. As such, the PRF and/or PRG can be used by both a compression algorithm and a decryption algorithm to gentable at the random entry. Having inserted the entry into a previously occupied index of the table, the resident data of the table may be inserted into another index that is in the table. Flow continues to operation 414 where the resident data is set or otherwise identified as a new entry into the table and flow returns to operation 404 where the resident entry is reinserted to a random index in the table. The method continues until an unoccupied random index is identified. Table 4 provides exemplary pseudo-code for randomly entries into a table.

TABLE 4

```
function RANDOMINSERT(s,T)              //Insert s into a random position in
T similar to cuckoo hashing
    Choose a random index r in T
    if T[r] = Λ then                    //Cell empty: insert the string
                                           and return
        T[r] ← s
    else                                //Cell occupied:
evict resident
        temp ← T[r]
        T[r] ← s
        s ← temp
        RANDOMINSERT(s, T)              //Insert old cell's value in
a new, random position
    end if
end function
```

Figure 5:
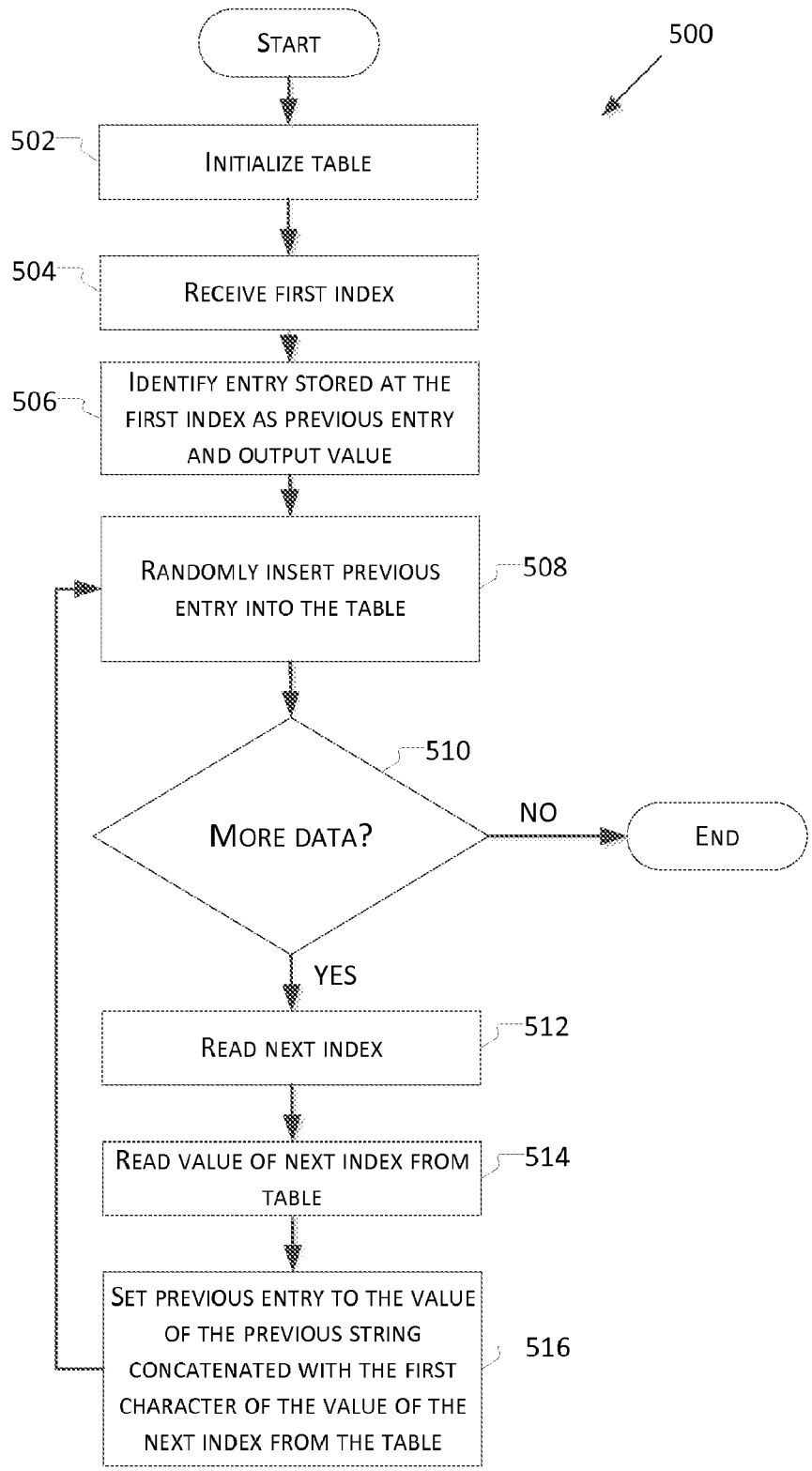
FIG. 5 is an exemplary method of performing secure decryption.

Having described various examples of performing secure compression, this disclosure will now describe an exemplary method to decrypt a securely compressed file. FIG. 5 is an exemplary method of performing secure decryption. Flow begins at operation 502 where the method 500 initializes a table. In one embodiment, the table may be initialized in the same manner as the secure compression method. For example, if the secure compression method created an initialized table by sequentially entering initial entries into the table, e.g., as described with respect to FIGS. 1 and 2, then the table initialized at operation 502 may be similarly initialized. If the secure compression method created an initialized by randomly inserting initial entries, e.g., as described with respect to FIG. 2, then the table initialized at operation 502 may be similarly initialized. Flow continues to operation 504 where the method 500 receives a first index value. For example, receiving the first index may include reading the first index from a securely compressed file. Flow continues to operation 506 where the entry at the first index is identified as the previous entry. Identifying the entry at the first index as the previous entry may comprise saving the entry at the first index to a temporary value or a temporary area of memory. Flow continues to operation 508, where the previous entry is randomly inserted into the table. The previous entry may be randomly inserted similar to the manners described with respect to FIGS. 1-3. In one aspect, the random insertion method utilized at operation 508 is the same random insertion method utilized by the secure compression method that was used to create the securely compressed file.

Flow continues to decision operation 510 where a determination is made as to whether there is more data to be decrypted. If there is no more data, then the file has been completely decrypted, flow branches NO and the method 500 completes. If there is more data to be decrypted, flow branches YES to operation 512 where the next index is read from the securely compressed file. Flow continues to operation 514 where the entry at the next index is read from the table to identify the next output for the decrypted file. After reading the entry from the next index in the table, flow continues to operation 516 where the previous entry stored at operation 506 is set to the entry at the next index and the entry at the next index is output to the decrypted file. Flow then returns to operation 508 and the method continues until all the data in the securely compressed file is decrypted. Table 5 provides exemplary pseudo-code for decrypting a securely compressed file.

TABLE 5

| Input: keys $k_{prf}$ and $k_{mac}$, input stream of indices I | |
|---|---|
| Output: output character stream O | |
| Read iv from I | |
| INITIALIZESQUEEZE($k_{prf}$, $k_{mac}$, iv, G, T, prev, c, m) | //Initialize PRG G, table T, variables prev and c, and MAC m |
| Read first index i | //The first loop iteration is special since prev = Λ |
| MACUPDATE($k_{mac}$, m, i) | |
| if T[i] is empty then | |
|     Output ⊥ and fail | //decoding failed: invalid index |
| end if | |
| Output T[i] | //Output T[i] and update prev |
| prev ← T[i] | |
| RANDOMINSERT(prev, T) | //Re-insert prev into the table |
| while there is more input in I do | //Start decompressing and decrypting I |
|     Read next index i | |
|     MACUPDATE($k_{mac}$, m, i) | |
|     Compute the pseudo-random index r of the new entry | //See where the new prev o c will be |
|     if T[i] is defined and k ≠ r then | //k is a valid index and is not part of a collision |
|         c ← HEAD(T[i]) | |
|         RANDOMINSERT(prev o c, T) | |
|     else if i = r then | //Special case: original input was prev o prev o c |
|         c ← HEAD(pref) | //The first character of prev is c. |
|         RANDOMINSERT(prev o c, T) | //We're decoding prev o c and it will be inserted into position r = k |
|     else | |
|         Output ⊥ and fail | //decoding failed: invalid index |
|     end if | |
|     Output T[i] | //Finally: output T[i] and update prev |
|     prev ← T[i] | |
|     RANDOMINSERT(prev, T) | //Re-insert prev into the table |
| end while | |
| MACFINALIZE($k_{mac}$, m) | //Finish computing the MAC |
| Read received MAC m' | |
| if m ≠ m' then | |
|     Output ⊥ and fail | //MAC did not verify: decryption failure |
| end if | |

Figure 6:
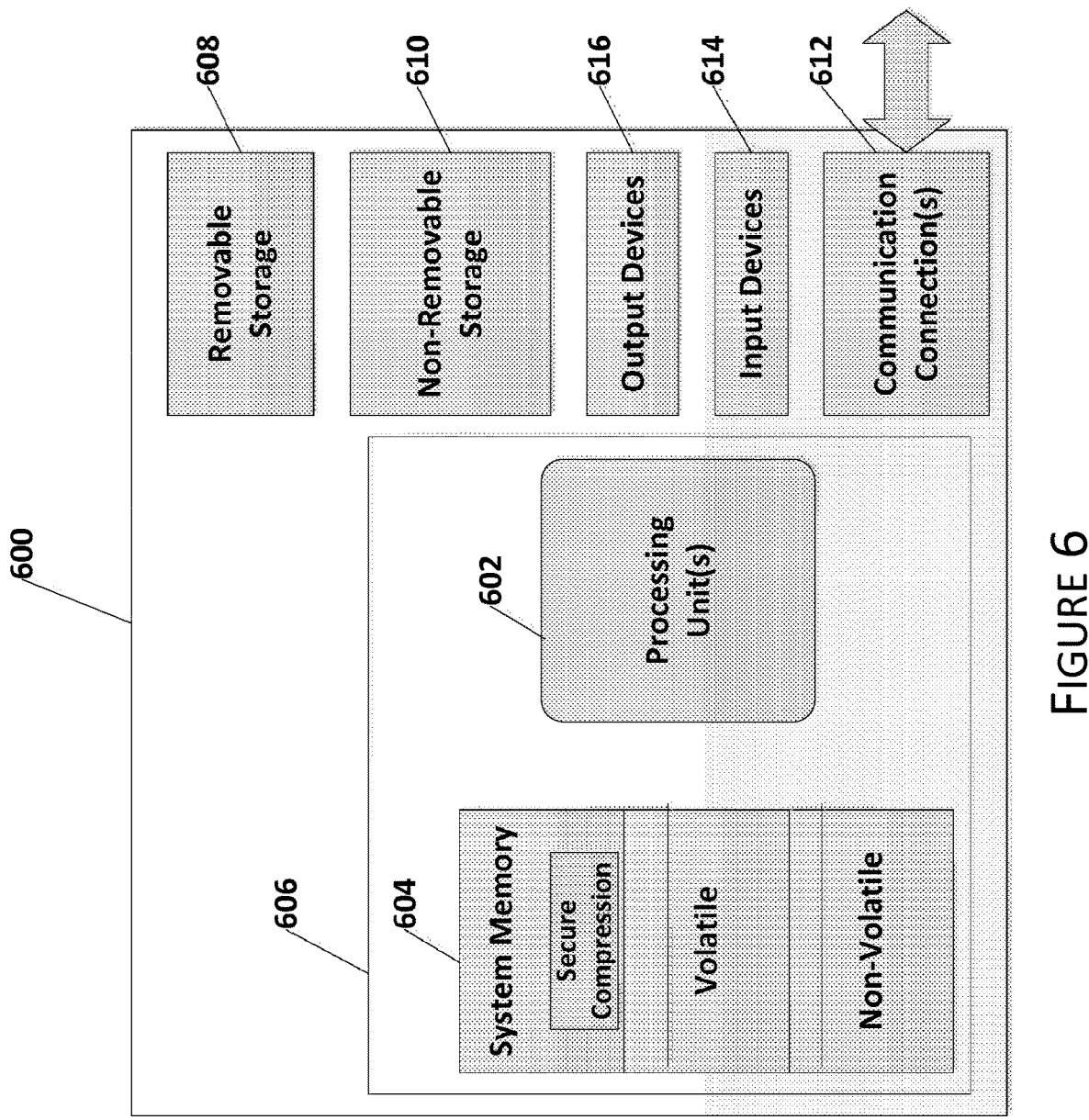
FIG. 6 illustrates one example of a suitable operating environment 600 in which one or more of the aspects of the disclosure may be implemented.

Having described various exemplary methods to perform secure compression and/or decryption, the disclosure will now describe systems that may be employed to perform the methods disclosed herein. FIG. 6 and the additional discussion in the present disclosure are intended to provide a brief general description of a suitable computing environment in which the disclosed embodiments and/or portions thereof may be implemented. Although not required, the embodiments described herein may be implemented as computer-executable instructions, such as by program modules, being executed by a computer, such as a client workstation or a server, including a server operating in a cloud environment. Generally, program modules include routines, programs, objects, components, data structures and the like that perform particular tasks or implement particular abstract data types. Moreover, it should be appreciated that the disclosed embodiments and/or portions thereof may be practiced with other computer system configurations, including hand-held devices, multi-processor systems, microprocessor-based or programmable consumer electronics, network PCs, minicomputers, mainframe computers and the like. The disclosed embodiments may also be practiced in distributed computing environments where tasks are performed by remote processing devices that are linked through a communications network. In a distributed computing environment, program modules may be located in both local and remote memory storage devices.

FIG. 6 illustrates one example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, operating environment 600 typically includes at least one processing unit(s) 602 and memory 604. Depending on the exact configuration and type of computing device, memory 604 (instructions to perform secure compression and/or secure decryption) may be volatile (such as RAM), nonvolatile (such as ROM, flash memory, etc.), or some combination of the two. Memory 604 may store computer instructions related to performing the secure compression embodiments disclosed herein, may store raw data, and/or may store compressed and encrypted data. Memory 604 may also store computer-executable instructions that may be executed by the processing unit(s) 602 to perform the methods disclosed herein.

This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as keyboard, mouse, pen, voice input, etc. and/or output device(s) 616 such as a display, speakers, printer, etc. Also included in the environment may be one or more communication connections, 612, such as an Ethernet adaptor, a modem, a Bluetooth adaptor, WiFi adaptor, etc.

Operating environment 600 typically includes at least some form of computer readable media. Computer readable media can be any available media that can be accessed by processing unit(s) 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Figure 7:
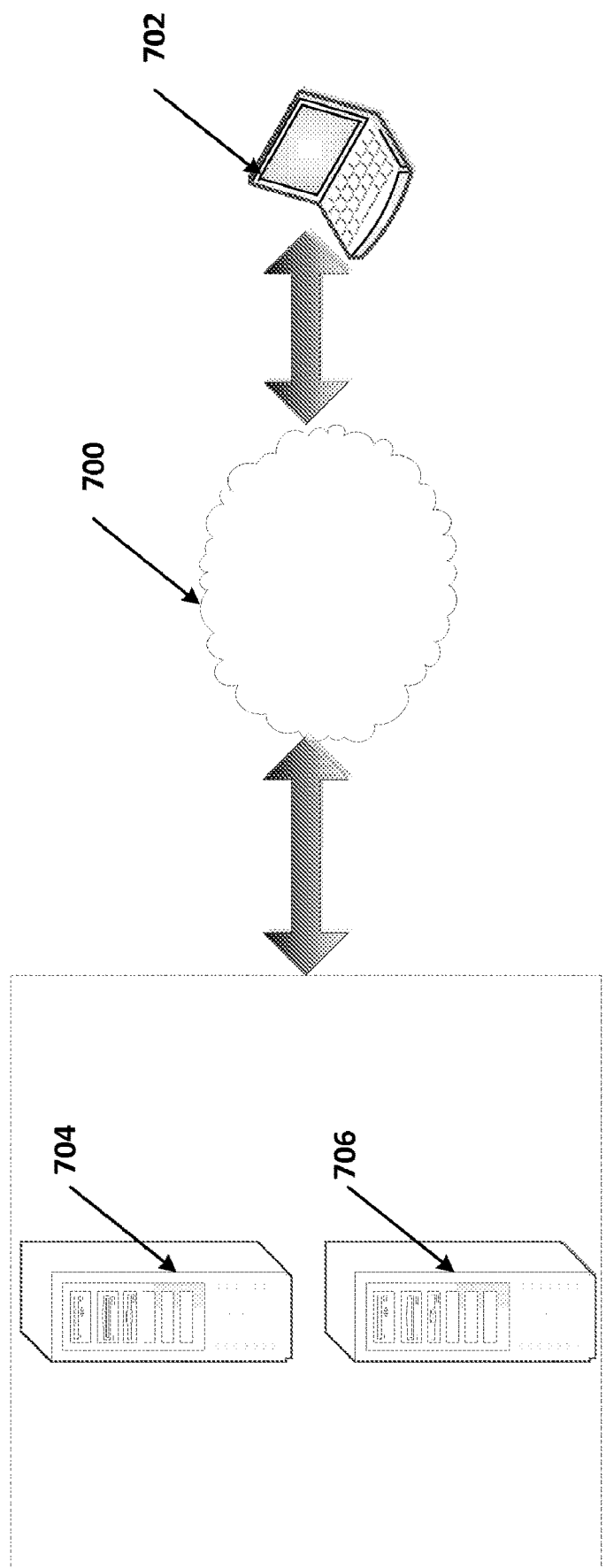
FIG. 7 network 700 in which the various systems and methods disclosed herein may operate.

FIG. 7 is an embodiment of a network 700 in which the various systems and methods disclosed herein may operate. In embodiments, a client device, such as client device 702, may communicate with one or more servers, such as servers 704 and 706, via a network 708. In embodiments, a client device may be a laptop, a personal computer, a smart phone, a PDA, a netbook, or any other type of computing device, such as the computing device in FIG. 1. In embodiments, servers 704 and 706 may be any type of computing device, such as the computing device illustrated in FIG. 1. Network 708 may be any type of network capable of facilitating communications between the client device and one or more servers 704 and 706. Examples of such networks include, but are not limited to, LANs, WANs, cellular networks, and/or the Internet.

In embodiments, the various systems and methods disclosed herein may be performed by one or more server devices. For example, in one embodiment, a single server, such as server 704 may be employed to perform the systems and methods disclosed herein, such a performing a primitive secure compression operation on data. Client device 702 may interact with server 704 via network 708 in order to request, view, operate upon, or otherwise access the raw or secure compressed data disclosed herein, etc., or any other object, property, and/or functionality disclosed herein. In further embodiments, the client device 706 may also perform functionality disclosed herein.

In alternate embodiments, the methods and systems disclosed herein may be performed using a distributed computing network, or a cloud network. In such embodiments, the methods and systems disclosed herein may be performed by two or more servers, such as servers 704 and 706. Although a particular network embodiment is disclosed herein, one of skill in the art will appreciate that the systems and methods disclosed herein may be performed using other types of networks and/or network configurations.

The aspects of the disclosure described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices can be employed to perform the functionality disclosed herein without departing from the scope of the disclosure.

This disclosure described some embodiments of the present technology with reference to the accompanying drawings, in which only some of the possible embodiments were shown. Other aspects can, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for performing secure compression, the method comprising:
   initializing a dictionary table comprising one or more character strings, wherein each of the one or more character strings is associated with a respective index;
   setting a prefix, wherein the prefix is a first character from a file;
   reading a second character from the file;
   concatenating the second character to the prefix to generate a first concatenated prefix;
   determining if the first concatenated prefix is in the dictionary table; and
   in response to determining that the first concatenated prefix is not in the dictionary table;
   outputting an index of the prefix representing the first character string from the file from the dictionary table,
   reinserting the prefix representing the first character string from the file at a random index of the dictionary table; and
   randomly inserting the first concatenated prefix into the dictionary table.

2. The method of claim 1, wherein at least one of the one or more strings comprises a single string character.

3. The method of claim 1, wherein initializing the dictionary table comprises inserting an end of file (EOF) character into the dictionary table.

4. The method of claim 1, wherein randomly inserting the first concatenated prefix into the dictionary table does not comprise randomly permuting the dictionary table.

5. The method of claim 1 further comprising:
   determining if there is more data in the file; and
   when there is more data in the file, performing operations comprising:
   setting the prefix to the first concatenated prefix;
   reading a third character from the file;
   concatenating the third character to the prefix to create a second concatenated prefix;
   determining if the second concatenated prefix is in the dictionary table; and
   when the second concatenated prefix is not in the dictionary table, randomly inserting the second concatenated prefix into the dictionary table.

6. A computer storage medium comprising computer executable instructions that, when executed by at least one processor, perform a method comprising:
   initializing a dictionary table with one or more character strings, each of the one or more character strings associated with a respective index setting a prefix to a first character from a file;
   reading a second character from the file;
   concatenating the second character to the prefix to create a concatenated prefix;
   determining if the concatenated prefix is in the dictionary table;
   in response to determining that the first concatenated prefix is not in the dictionary table:
   outputting an index of the prefix representing the first character string from the file from the dictionary table,
   reinserting the prefix representing the first character string from the file at a random index of the dictionary table; and
   randomly inserting the first concatenated prefix into the dictionary table.

7. The computer storage medium of claim 6, wherein the random index is generated based upon a key.

8. The computer storage medium of claim 7, wherein the random permutation value is generated using at least one of: a deterministic pseudo-random generator; and a deterministic pseudo-random function.

9. The computer storage medium of claim 6, wherein at least one of the one or more strings comprises a single string character.

10. The computer storage medium of claim 6, wherein initializing the dictionary table further comprises inserting an end of file (EOF) character into the dictionary table.

* * * * *